(12) United States Patent
Delfvett et al.

(10) Patent No.: US 7,372,551 B1
(45) Date of Patent: May 13, 2008

(54) SYSTEMS AND METHODS FOR LONG-RANGE, HIGH-RESOLUTION LASER RADAR RANGE DETECTION

(75) Inventors: Peter J. Delfvett, Orlando, FL (US);
Kyungbum Kim, Orlando, FL (US);
Leonard Kisimbi, Orlando, FL (US);
Shinwook Lee, Orlando, FL (US)

(73) Assignee: University of Central Florida Research Foundation, Orlando, FL (US)

( * ) Notice: Subject to any disclaimer, the term of this patent is extended or adjusted under 35 U.S.C. 154(b) by 0 days.

(21) Appl. No.: 11/492,744

(22) Filed: Jul. 25, 2006

(51) Int. Cl.
*G01C 3/08* (2006.01)

(52) U.S. Cl. .................................................. 356/5.15

(58) Field of Classification Search .............. 356/5.15
See application file for complete search history.

(56) References Cited

U.S. PATENT DOCUMENTS 5,835,199 A * 11/1998 Phillips et al. ............. 356/5.03

* cited by examiner

*Primary Examiner*—Thomas H. Tarcza
*Assistant Examiner*—Luke D. Ratcliffe
(74) *Attorney, Agent, or Firm*—Thomas, Kayden, Horstemeyer & Risley, LLP

(57) ABSTRACT

Provided are systems and methods for long-range, high-resolution, laser radar range detection. In one embodiment such a system includes an optical pulse modifier configured generated a stretched optical pulse and an optical amplifier configured to increase an optical power of the stretched optical pulse The system can further include an optical spectrum analyzer configured to determine a wavelength of a spectral peak that results from interference between a first amplified stretched pulse that is reflected from a target and a second amplified stretched pulse that is spectrally reversed.

18 Claims, 6 Drawing Sheets

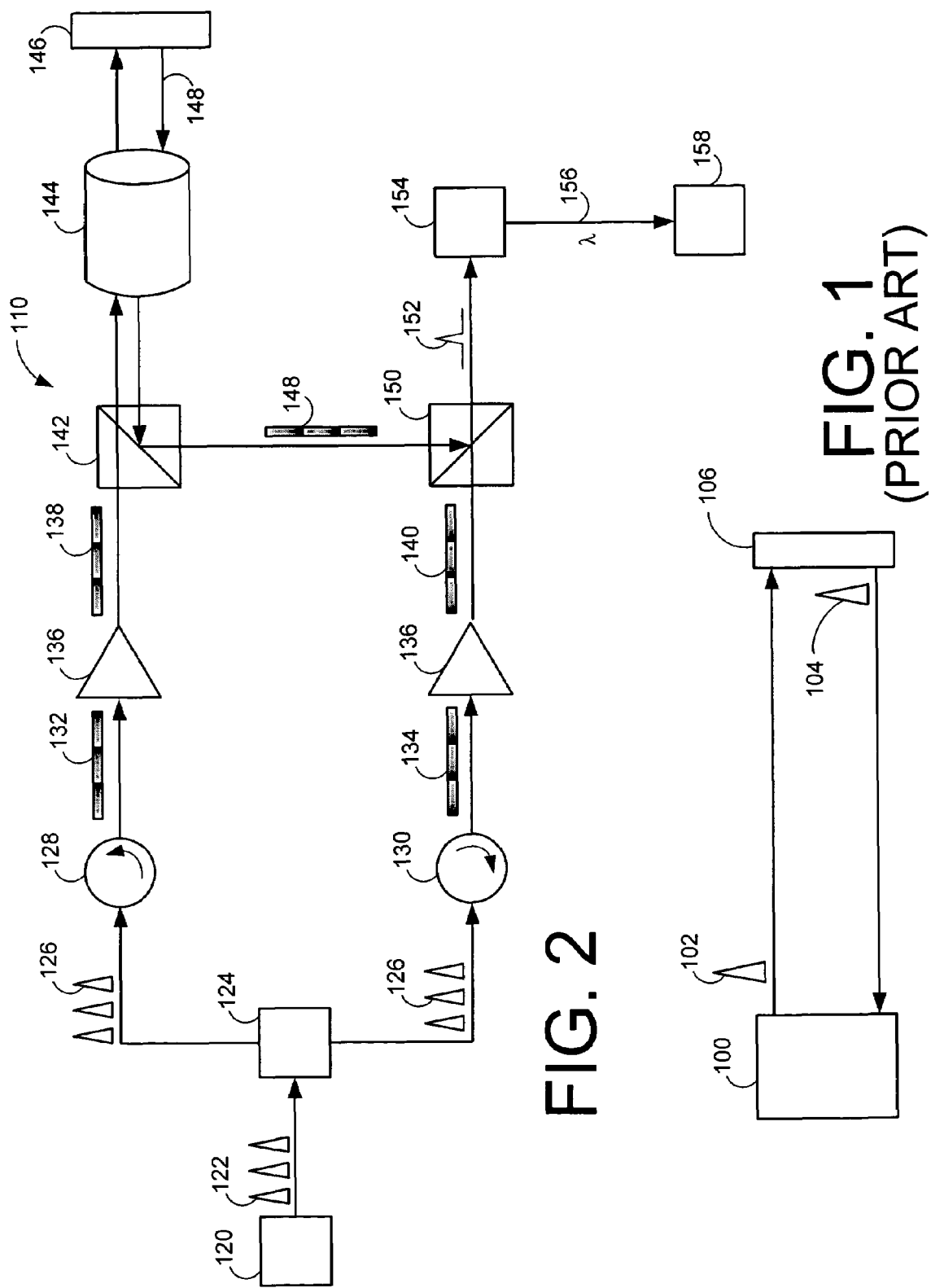

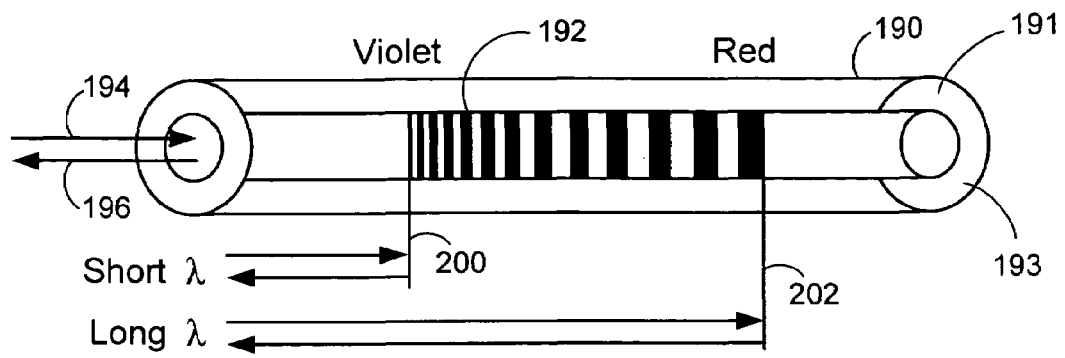
FIG. 5
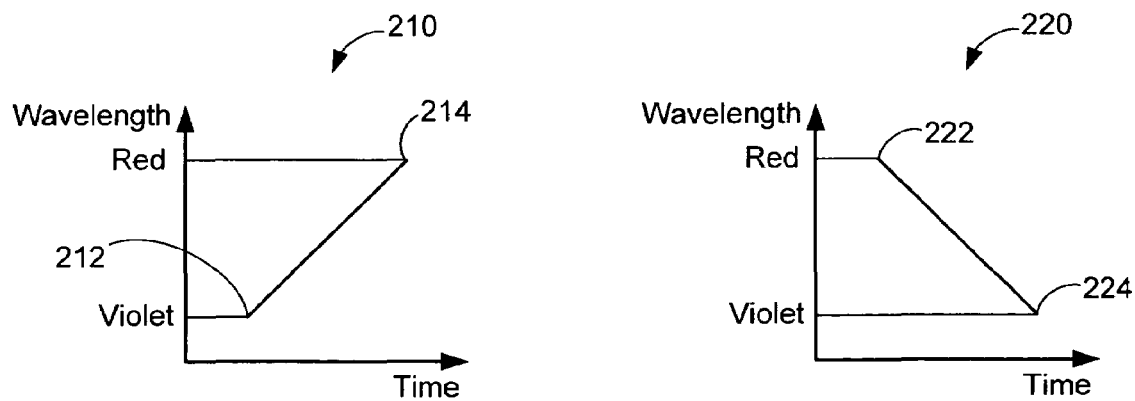
FIG. 6A
FIG. 6B

SYSTEMS AND METHODS FOR LONG-RANGE, HIGH-RESOLUTION LASER RADAR RANGE DETECTION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Fhoenics Program MDA 97203C0043 awarded by DARPA of the U.S. Government.

TECHNICAL FIELD

The present disclosure is generally related to laser radar systems, more particularly, is related to systems and methods for long-range, high-resolution laser radar range detection.

BACKGROUND

A combination of radar and optics provides a system with inherently enhanced accuracy in the measurement of range, velocity and angular displacement, and improved countermeasure resistance. For example, laser radar is simply radar transformed from measuring reflected radio frequency electromagnetic radiation to locate spatially removed objects, to a system that operates on laser radiation. The high carrier frequency allows laser radar systems to be made more compact in physical dimension, which is particularly attractive in aircraft, projectile, space, and other volume-limited applications.

Disadvantageously, the penetrating ability of optical radiation is severely degraded by, for example, weather-related atmosphere disturbances. Consequently, the major developments in laser radar technology have been directed at range-finding capabilities, particularly as fire control for mobile and air defense weapon systems. Laser radar technology can also be used as a proximity fuzing device.

Laser radar systems typically use the time of travel of a reflected signal to calculate a range value. For example, briefly referring to FIG. 1, a laser radar system 100 transmits a pulse 102 to a target 106. The transmitted pulse 102 reflects from the target 106 in the form of a reflected pulse 104. The laser radar system 100 receives the reflected pulse 104 and determines the distance to the target based on the time of travel of the laser pulse. The resolution of the time of travel calculation, however, is limited to the length of the laser pulse utilized by the system. For at least this reason, short pulse lasers are ideally used to increase resolution. Additionally, measurement over long distances requires laser pulses to have high total energy levels for reliable reflected laser detection. The short pulses, however, are difficult to amplify to an energy level sufficient to achieve desirable long range performance. Longer pulses that are capable of containing sufficient energy, however, reduce the resolution to an undesirable level. Thus, a need exists in the industry to provide high-resolution long-range laser radar range detection.

SUMMARY

Embodiments of the present disclosure provide a system and method for long-range, high-resolution, laser radar range detection. In one embodiment a system includes: an optical pulse modifier configured to generate a stretched optical pulse; an optical amplifier configured to increase an optical power of the stretched optical pulse; and an optical spectrum analyzer configured to determine a wavelength of a spectral peak that results from interference between a first amplified stretched pulse that is reflected from a target and a second amplified stretched pulse that is spectrally reversed.

In one embodiment, a method includes: amplifying a first stretched optical pulse and a second stretched optical pulse; combining a reflected amplified first stretched optical pulse and an amplified second stretched optical pulse to generate a combined stretched optical pulse; and determining a wavelength of a spectral peak in the combined stretched optical pulse.

In a further embodiment, a method includes: generating a short optical pulse; splitting the optical pulse into a first optical pulse and a second optical pulse; stretching each of the first optical pulse and the second optical pulse; amplifying each of the first optical pulse and the second optical pulse; transmitting the first optical pulse towards a target; receiving a reflected optical pulse from the target; mixing the reflected optical pulse and the second optical pulse to generate a combined optical pulse; and determining a spectral peak in the combined optical pulse corresponding to a temporal delay.

Other systems and methods will be or become apparent from the following drawings and detailed description.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

FIG. 1 is a block diagram illustrating an elementary laser radar system found in the prior art.

FIG. 2 is a block diagram illustrating an embodiment of a system for long-range, high-resolution laser radar range detection.

FIG. 5 is a partial cut-away view of an illustration of a chirped fiber Bragg grating.

FIGS. 6A and 6B are graphs illustrating an embodiment of an up-chirped pulse and a down-chirped pulse, respectively.

DETAILED DESCRIPTION

Figure 3:
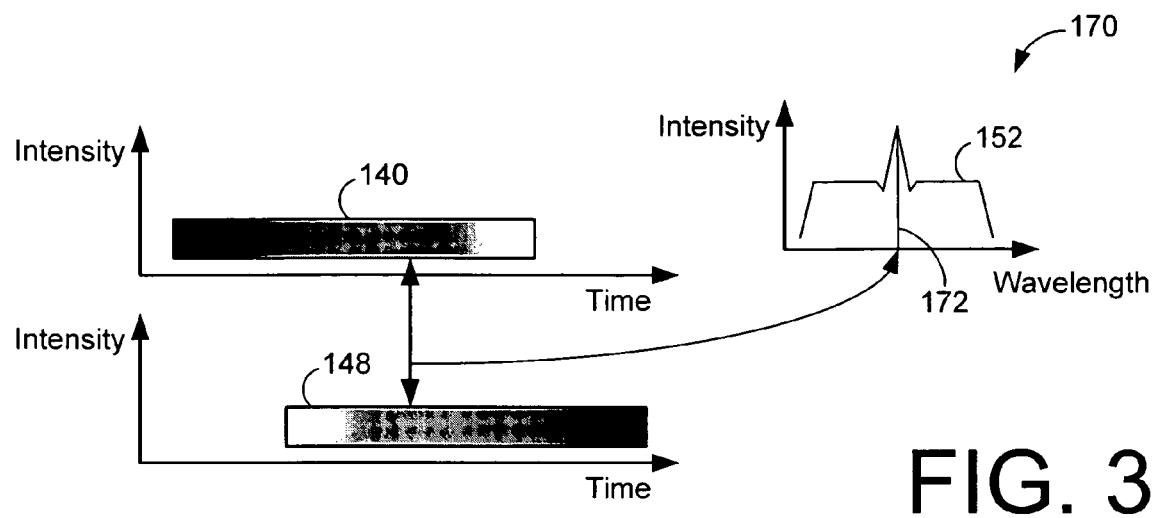
FIG. 3 is a series of simplified graphs illustrating the generation of a spectral peak by interfering a reference optical pulse and a reflected optical pulse.

Reference will now be made to the drawings. While the disclosure will be provided in connection with these drawings, there is no intent to limit the disclosure to the embodiment or embodiments disclosed herein. On the contrary, the intent is to cover all alternatives, modifications, and equivalents.

Reference is made to FIG. 2, which is a block diagram illustrating an embodiment of a system 110 for long-range, high-resolution laser radar range detection. The system 110 includes a pulse generator 120 configured to generate short optical pulses 122. In some embodiments the duration of the short optical pulses 122 can be approximately 0.5 picoseconds, for example. The short optical pulses 122 are received by an optical splitter 124 that is configured to split the short optical pulses 122 into identically configured sets of short optical pulses 126.

One set of the short optical pulses 126 is received by a first optical pulse modifier 128. The first optical pulse modifier 128 stretches the short optical pulses to temporal durations extending, for example, to several tens of nanoseconds. The first optical pulse modifier 128 is configured to produce temporally stretched pulses that possess an instantaneous frequency that linearly changes from, for example, a low frequency to a high frequency. In this manner, an up-chirped stretched optical pulse 132 is generated. The up-chirped stretched optical pulse is received by an optical amplifier 136, which is configured to significantly increase the energy of the up-chirped stretched optical pulse 132 to create an amplified up-chirped stretched optical pulse 138.

The amplified up-chirped stretched optical pulse 138 can be transmitted through, for example, a reflected pulse beam splitter 142. The amplified up-chirped stretched optical pulse 138 can then be focused and/or directed using other optical elements 144. examples of optical elements include, but are not limited to one or more lenses, mirrors, focusing elements, and a combination thereof, among others. The amplified up-chirped stretched optical pulse 138 is directed to a target 146 and a reflected pulse 148 is received from the target 146 by the optical elements 144. While the optical elements 144 of some embodiments are capable of transmitting and receiving the optical pulses, the system can also be configured with dedicated transmitting optics and receiving optics.

The optical elements 144 transmit the reflected pulse 148 through, for example, the reflected pulse beam splitter 142, which directs the reflected pulse 148 to an optical mixer 150. Similarly, another set of the short optical pulses are transmitted by the optical splitter 124 and are received by a second optical pulse modifier 130. The second optical pulse modifier 130 is configured to temporally stretch the short optical pulses to temporal durations that extend several tens of nanoseconds, for example. In this case the temporally stretched pulses possess an instantaneous frequency that linearly changes from a high frequency to a low frequency, also referred to as down-chirp. The down-chirped stretched optical pulse 134 is received by an optical amplifier 136, which produces an amplified down-chirped stretched optical pulse 140. The optical mixer 150 receives the amplified down-chirped stretched optical pulse 140 and combines it with the reflected pulse 148 to produce a combined optical pulse 152.

The combined optical pulse 152 is transmitted to an optical spectrum analyzer 154 that is configured to determine the wavelength 156 of the spectral peak of the combined optical pulse 152. The wavelength 156 can then be used to determine the temporal delay between the amplified down-chirped stretched optical pulse 140 and the reflected pulse 148. Since the temporal delay varies as the distance to the target varies, distance calculation logic 158 can be utilized to determine the distance to the target.

The short optical pulse 122 can be generated from, for example, a mode-locked laser. The optical pulse modifiers 128 and 130 can be, for example, chirped fiber Bragg gratings that are configured to stretch the optical pulse to one having a longer temporal duration and an instantaneous frequency that linearly changes from either low-frequency to high-frequency, or from high-frequency to low-frequency. It should be noted that the up-chirped stretched optical pulse 132 is temporally reversed from the down-chirped stretched optical pulse 134. In this manner, identical, but time reversed, optical pulses are generated. The optical mixer 150 can be, for example, a beam splitter or a 2×2 coupler. The combined optical pulse 152 is configured such a change in the distance to the target 146 will shift the overlap between the reflected pulse 148 and the amplified down-chirped stretched optical pulse 140. As this overlap shifts, the wavelength of the peak and spectral intensity changes. For example, detected spectral intensity is given by:

$$I_{TOT}(\omega))=2I(\omega)[1+\cos(2\alpha\omega^2+\tau\omega)] \quad \text{Equation 1}$$

In Equation 1, I(ω) represents the spectral intensity of a mode-locked laser, α is related to the chirp rate, ω is the angular frequency, and τ is the temporal delay between the combined beams. Thus, the total detected spectral intensity is modulated in frequency, where the rate of modulation varies quadratically. In this manner, the periodicity varies linearly across the spectrum. Additionally, depending on the value of the delay τ, the periodicity can increase or decrease across the spectrum. For example, where the stretched pulses from mode-locked laser include temporal durations that completely fill the pulse repetition rate, the modulation rate will decrease and subsequently increase. The frequency at which the modulation rate goes to zero is precisely determined by τ and uniquely determines the temporal delay, which is determined by the position of the target.

Reference is now made to FIG. 3, which is a series of simplified graphs illustrating the generation of a spectral peak by interfering a reference optical pulse and a reflected optical pulse. An amplified down-chirped stretched optical pulse 140, which can also be referred to as a reference optical pulse, is combined with a reflected pulse 148 that was transmitted to the target as an amplified up-chirped stretched optical pulse. Note that the direction of the frequency sweep or chirp on the two pulses 140 and 148 are opposite but otherwise identical. Where the two pulses 140 and 148 are combined, there is a single wavelength, λ, that is present at the same point in time in each of the amplified down-chirped stretched optical pulse 140 and the reflected pulse 148. The value of λ is dependent on the temporal delay, τ. In this manner, the spectral peak 178 of the combined optical pulse 152 occurs at the wavelength λ.

Figure 4:
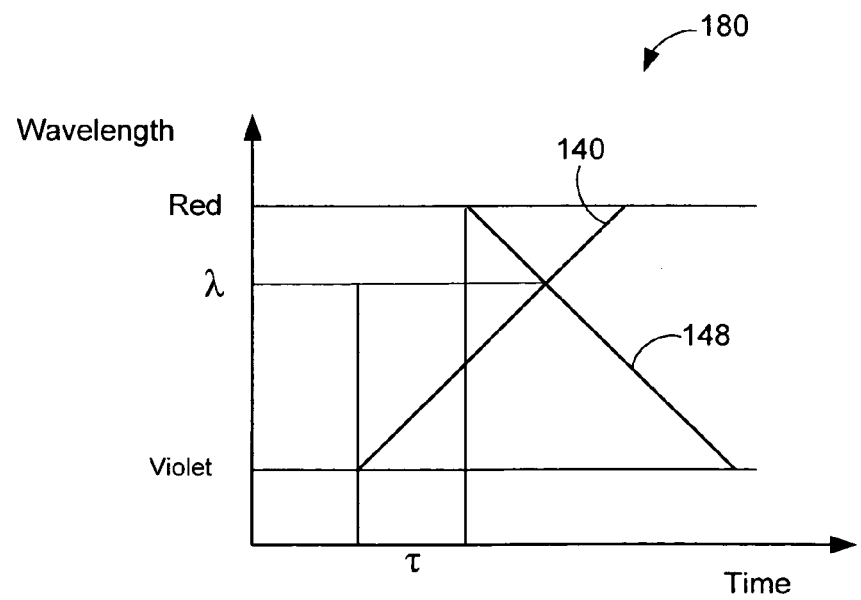
FIG. 4 is a graph illustrating a plot of the wavelengths in the time domain of a reference optical pulse and a reflected optical pulse.

Reference is now made to FIG. 4, which is a graph illustrating a plot of wavelengths of a reference optical pulse and a reflected optical pulse in the time domain. The graph 180 plots the wavelength versus the time of the amplified down-chirped stretched optical pulse 140 and a reflected pulse 148. Note that the reflected pulse 148 is up-chirped and therefore a time reversed optical pulse from the amplified down-chirped stretched optical pulse 140. While the examples disclosed herein utilize an amplified down-chirped stretched optical pulse as a reference pulse and a reflected pulse from an amplified up-chirped stretched optical pulse, the systems and methods herein will perform equally well using an up-chirped reference pulse and a down-chirped reflected pulse. Note that the reflected pulse 148 is temporally delayed relative to the amplified down-chirped stretched optical pulse 140 by a value τ. The intersection between the amplified down-chirped stretched optical pulse 140 and the reflected pulse 148 results in a spectral peak that occurs at a wavelength λ. By utilizing the value of the wavelength λ, the value of the temporal delay, τ can be determined. In this manner, a high-level resolution can be achieved using relatively long pulses.

Reference is now made to FIG. 5, which is a partial cut-away view of an illustration of a chirped fiber Bragg grating as utilized to stretch optical pulses. The chirped fiber Bragg grating 190 can be used to modify optical pulses. The chirped fiber Bragg grating 190 includes a core 191 surrounded by a cladding 193. The core 191 includes multiple wavelength specific reflectors 192. The wavelength specific reflectors 192 are configured to reflect different wavelengths of an optical signal 194 travelling through the core 191 at different distances along the optical path. When an optical pulse input 194 is transmitted into the core 191, the portion of the optical pulse input 194 having a short wavelength is reflected at a short wavelength reflection point 200. Similarly, the portion of the optical pulse input 194 having a long wavelength is reflected at a long wavelength reflection point 202. Multiple reflectors are placed between the short wavelength reflection point 200 and the long wavelength reflection point 202 to define multiple reflection points that can correlate linearly, for example, with the different wavelengths between the short wavelength and the long wavelength. The reflected light is transmitted from the core 191 as an optical pulse output 196. Since the portion of the optical pulse output 196 having a short wavelength travels a shorter distance than the portion of the optical pulse output 196 having a longer wavelength, the optical pulse output 196 is stretched and configured to have a wavelength or frequency sweep from the short wavelength to the long wavelength. In the case where a reversed chirped direction is desired, the optical pulse input 194 would be transmitted into the opposite end of the core 191. Although the chirped fiber Bragg grating 190 is presented as having a linear relationship between the wavelength and the stretched pulse duration, other embodiments can include non-linear configurations such as a cascade arrangement having several gratings with increasing period that can be used to simulate long-chirped gratings, among others.

Reference is now made to FIGS. 6A and 6B, which are graphs illustrating an embodiment of an up-chirped pulse and a down-chirped pulse, respectively. The up-chirp graph 210 illustrates a linearly stretched optical pulse that increases in wavelength from, for example, a wavelength associated with a violet color on the visible spectrum at a starting point of the pulse 212. The wavelength increases proportionately through the duration of the pulse and ends, for example, at a wavelength corresponding to red on the visible spectrum at the end of the up-chirp pulse 214. Similarly, the graph of the down-chirped pulse 220 has the start of a down-chirp pulse 222 at a wavelength corresponding to, for example, red on the visible spectrum and an end of the down-chirped pulse 224 and a wavelength corresponding to, for example, violet on the visible spectrum. As discussed above in reference to FIG. 5, the chirped pulses can also be configured in a non-linear relationship relative to the duration of the pulse. For example, the wavelength can be configured to vary logarithmically as a function of time.

Figure 7A:
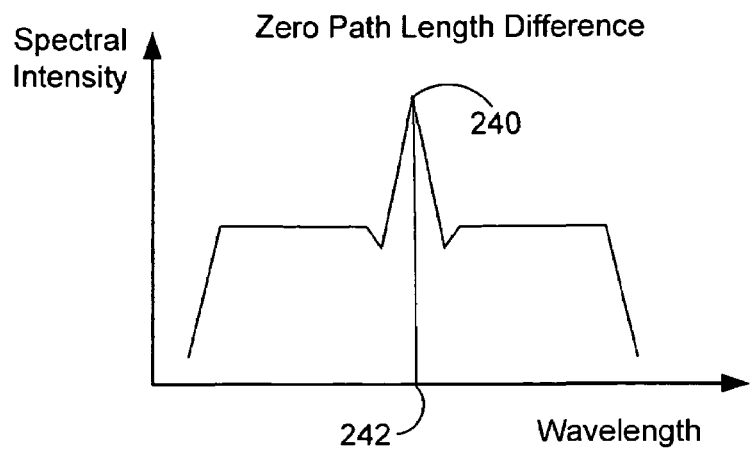
FIGS. 7A-7C are graphs illustrating plots of spectral intensities corresponding to different target positions.
Figure 7B:
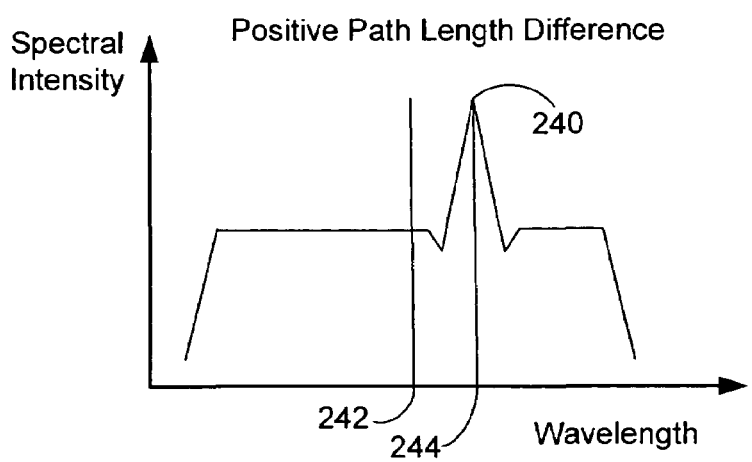
Figure 7C:
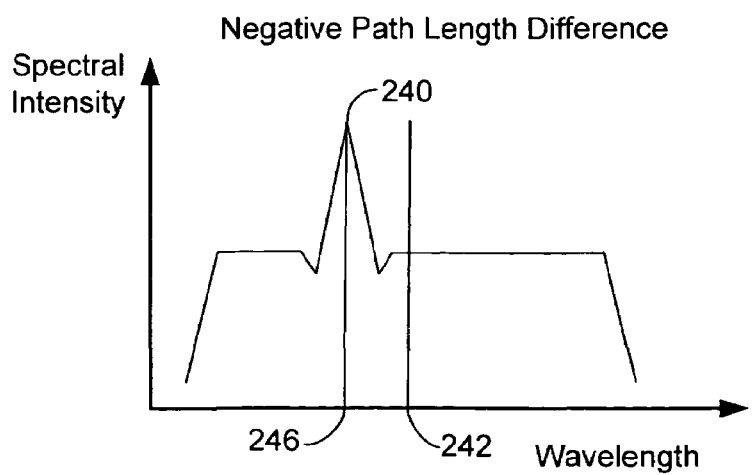

Reference is now made to FIGS. 7A-7C, which are graphs illustrating sample plots of spectral intensities for three different target positions, respectively. The three different target positions corresponding to FIGS. 7A, 7B, and 7C, correlate to a zero path length difference, a positive path length difference, and a negative path length difference, respectively.

Referring first to FIG. 7A, the spectral peak 240 occurs at a zero difference wavelength 242 where the target has not moved since a prior determination. As illustrated in FIG. 7B as the path length shifts in a positive direction, the spectral peak 240 also shifts and occurs at a positive difference wavelength 244. By measuring the positive wavelength 244 at which the spectral peak 204 occurs, the path length difference can be determined in terms of both magnitude and direction. Similarly, referring to FIG. 7C, the spectral peak 240 occurs at a different point in the circumstance of a negative difference in target position. By determining the value of the negative difference wavelength 246, the actual path length difference can be determined.

Figure 8:
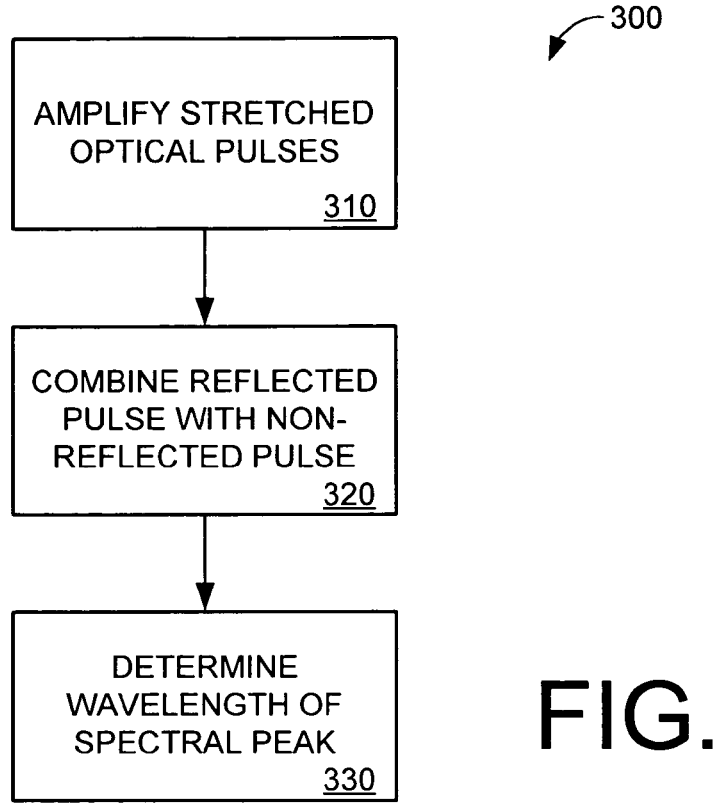
FIG. 8 is a block diagram illustrating an embodiment of a method for long-range, high-resolution laser radar range detection.

Reference is now made to FIG. 8, which is a block diagram illustrating an embodiment of a method for long-range, high-resolution laser radar range detection. The method begins with amplifying stretched optical pulses in block 310. Although an initial short optical pulse can be generated with a high-energy level, as the optical pulses are stretched, the energy per unit time is diminished and can be rendered too weak for use in long-range detection. In this manner, by amplifying the stretched optical pulses, the energy per unit time of the stretched optical pulses is increased such that long-range applications are viable. Reflected pulses are combined with non-reflected pulses in block 320. Based on the distance traveled to and from the target, the reflected pulse will exhibit some temporal delay relative to a non-reflected pulse. Additionally, the reflected pulse and the non-reflected pulse can be configured as temporally opposite chirped pulses. The combination of the reflected pulse and the non-reflected pulse will generate a spectral peak.

The wavelength of the spectral peak is determined in block 330. Based on the value of the wavelength, the temporal delay between the reflected pulse and the non-reflected pulse can be determined at a high resolution. Accordingly, by determining the temporal delay between the reflected pulse and the non-reflected pulse, the distance to the target can be determined. For example, using a five nanosecond stretched optical pulse, a spatial resolution of approximately 7 millimeters has been achieved at distances over several kilometers. Increased distances up to, for example, 200 kilometers, can be achieved by reducing the optical longitudinal mode line width, which is a characteristic of the optical source.

Figure 9:
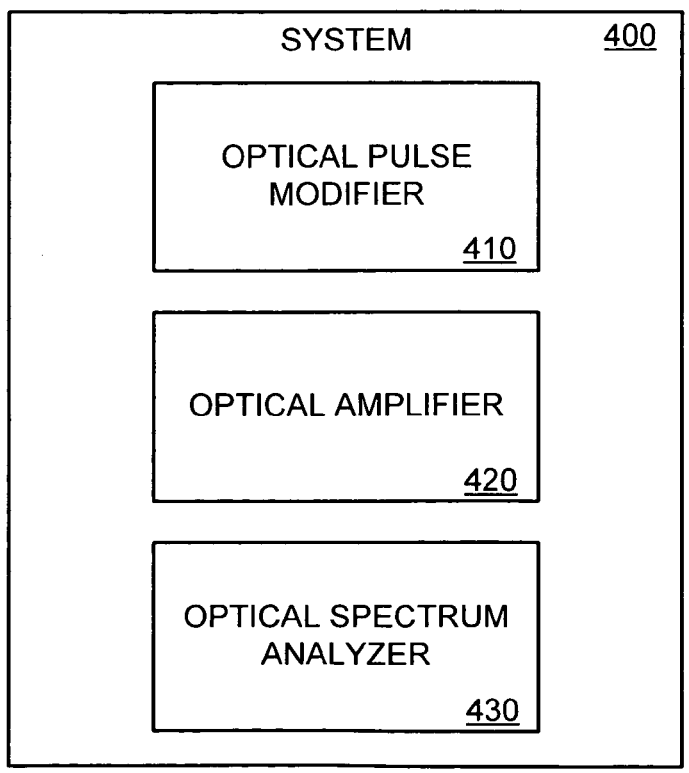
FIG. 9 is a block diagram illustrating an embodiment of a system for long-range, high-resolution laser radar range detection.

Reference is now made to FIG. 9, which is a block diagram illustrating an embodiment of a system for long-range, high-resolution laser radar range detection. The system 400 includes an optical pulse modifier 410. The optical pulse modifier can be, for example, a chirped fiber Bragg grating and can be used to temporally stretch the duration of an optical pulse by reflecting different wavelengths of the optical pulse at different distance intervals. The result can be an up or down-chirped stretched optical pulse. One effect of stretching the optical pulse is that the energy per unit time of the stretched pulse is reduced proportionately. The reduction in energy can render the stretched optical pulse insufficient to meet the demands of long-range applications. The system 400 also includes an optical amplifier 420, which is configured to increase the optical power of the stretched optical pulse. The increase in optical power permits the use of the stretched optical pulse in long-range applications. The system 400 also includes an optical spectrum analyzer 430 that is configured to determine the wavelength of a spectral peak that results from the interference between a first amplified stretched optical pulse reflected from a target and a second amplified stretched optical pulse. The second amplified stretched optical pulse can also be referred to as a reference pulse. The wavelength of the spectral peak varies as a function of the temporal delay between the reflected pulse and the reference pulse. By determining the wavelength of the spectral peak, the distance to the target can be determined with high resolution.

Figure 10:
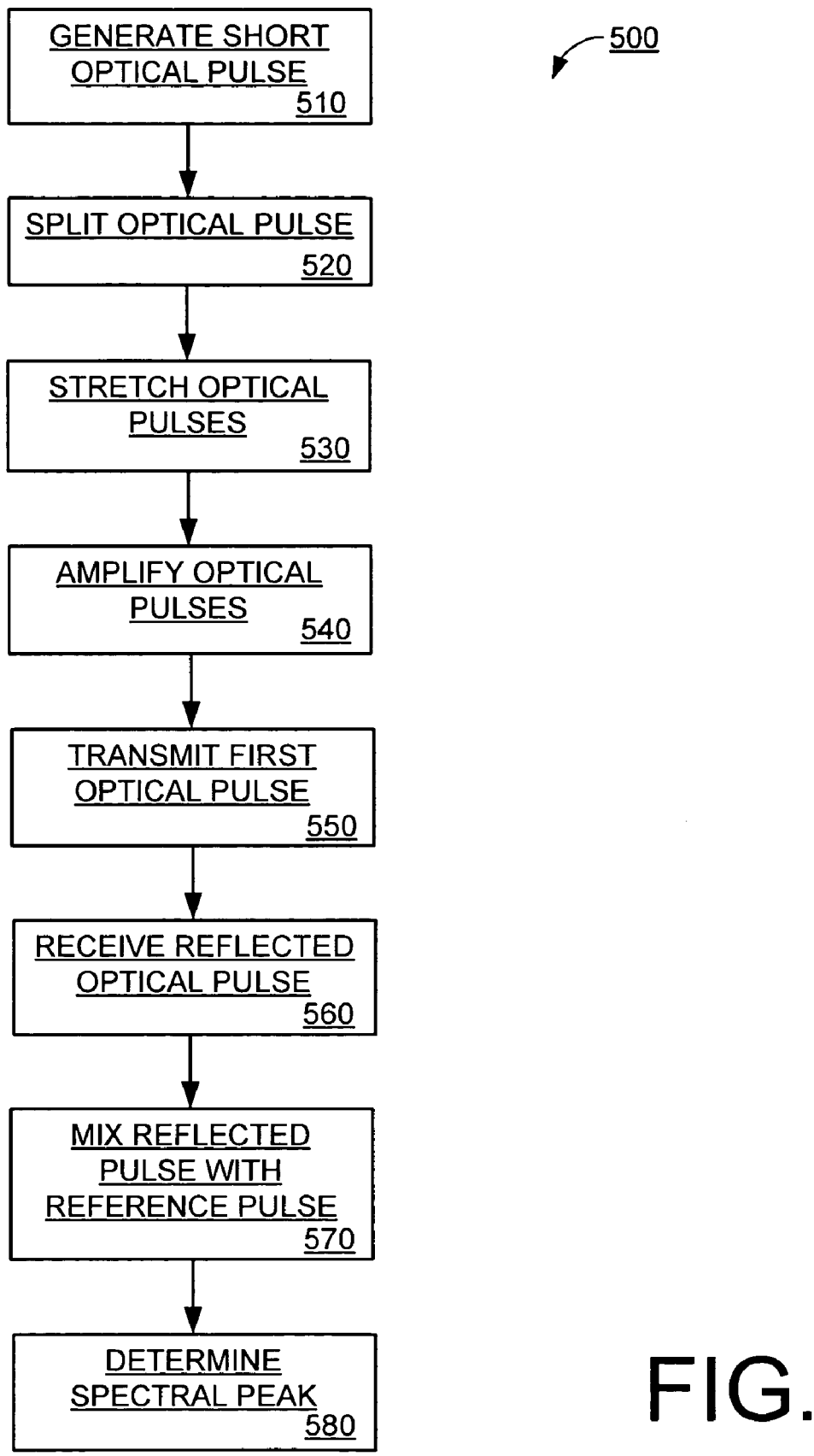
FIG. 10 is a block diagram illustrating an embodiment of a method for long-range, high-resolution laser radar range detection.

Reference is now made to FIG. 10, which is a block diagram illustrating an embodiment of a method for long-range high-resolution laser radar range detection. The method 500 includes generating a short optical pulse in block 510. The short optical pulse can be generated using, for example, a mode-locked laser source. In some embodiments, the short optical pulse can be generated as a series of short optical pulses as well. In some embodiments the short optical pulse can be in the range of 0.5 picoseconds or less. The optical pulse is split in block 520 to generate two identical pulses or strings of pulses. The optical pulses are stretched in block 530. The pulses in one of the split optical pulse strings are temporally stretched to generate pulses having durations up to several tens of nanoseconds. The temporally stretched pulses possess instantaneous frequencies that change from, for example, a low frequency to a high frequency. This pulse configuration, also referred to as an up-chirp, can occur, for example, in the first pulse or string of pulses. Similarly, the second or other split optical pulses are temporally stretched. These temporally stretched pulses, also referred to as down-chirped, possess an instantaneous frequency that changes from a high frequency to a low frequency. Although each of the short optical pulses can be generated at a relatively high energy level, the process of stretching the pulses diminishes the power energy per unit time.

The low energy level of the stretched optical pulses renders them insufficient for long-range applications. For this reason, the stretched optical pulses are amplified in block 540. After amplification, the first optical pulse or series of pulses is transmitted toward a target in block 550. A reflection of the transmitted optical pulse is received in block 560 and the reflected pulse is mixed with a reference pulse in block 570. The reference pulse is an amplified stretched optical pulse having an opposite frequency sweep or chirp. By mixing the reflected pulse with the reference pulse in block 570, a combined optical pulse is generated. The combined optical pulse contains a spectral peak at a specific wavelength. The wavelength of the spectral peak is determined in block 580, where the wavelength corresponds to the temporal delay between the reference pulse and the reflected pulse. By determining the temporal delay between the reference pulse and the reflected pulse, the distance to the target can be determined at a high-level of resolution.

It should be emphasized that the above-described embodiments of the present disclosure, particularly, any illustrated embodiments, are merely possible examples of implementations. Many variations and modifications may be made to the above-described embodiment(s) of the disclosure without departing substantially from the spirit and principles of the disclosure.

The invention claimed is:

1. A method for long-range, high-resolution laser radar range detection, the method comprising:
   generating a short optical pulse;
   splitting the optical pulse into a first optical pulse and a second optical pulse;
   modifying the first optical pulse such that it is temporally stretched and has a first direction of frequency sweep;
   modifying the second optical pulse such that it is temporally stretched and has a second direction of frequency sweep, the second direction of frequency sweep being opposite to the first direction of frequency sweep;
   transmitting the first optical pulse towards a target;
   receiving a reflected optical pulse from the target, the reflected optical pulse also having the first direction of frequency sweep;
   mixing the reflected optical pulse and the second optical pulse to generate a combined optical pulse; and
   determining a spectral peak in the combined optical pulse, the spectral peak having a wavelength that is equal to a wavelength that is present at the same point in time in each of the reflected optical pulse and the second optical pulse, the wavelength corresponding to a temporal delay indicative of the range of the target.

2. The method of claim 1, wherein the first optical pulse comprises an up-chirped stretched optical pulse after being modified.

3. The method of claim 2, wherein the second optical pulse comprises a down-chirped stretched optical pulse after being modified.

4. A system for long-range, high-resolution, laser radar range detection, the system comprising:
   a first optical pulse modifier configured to generate a first stretched optical pulse having a first direction of frequency sweep;
   a second optical pulse modifier configured to generate a second stretched optical pulse having a second direction of frequency sweep, the second direction of frequency sweep being opposite to the first direction of frequency sweep; and
   an optical spectrum analyzer configured to determine a wavelength of a spectral peak that results from interference between the first stretched optical pulse after it is reflected from a target and the second stretched optical pulse, the wavelength of the spectral peak being a wavelength that is present at the same point in time in both of the optical pulses.

5. The system of claim 4, wherein the first and second optical pulse modifiers comprise first and second chirped fiber Bragg gratings, each grating comprising multiple wavelength-specific reflectors configured to reflect different wavelengths of an optical signal at different distances.

6. The system of claim 5, wherein the first chirped fiber Bragg grating comprises an up-chirp grating.

7. The system of claim 6, wherein the second chirped fiber Bragg grating comprises a down-chirp grating.

8. The system of claim 4, further comprising a pulse generator configured to generate an optical pulse that is received by the pulse modifiers.

9. The system of claim 8, wherein the pulse generator comprises a mode-locked laser.

10. The system of claim 8, further comprising an optical splitter configured to split the optical pulse into a first optical pulse and a second optical pulse.

11. The system of claim 4, further comprising diagnostic logic configured to calculate a temporal delay using the wavelength of the spectral peak.

12. The system of claim 4, further comprising an optical mixer configured to mix the first and second stretched optical pulses.

13. A method for long-range, high-resolution laser radar range detection, the method comprising:

generating a first stretched optical pulse and a second stretched optical pulse from an original optical pulse, the first and second stretched optical pulses having opposite frequency sweeps;

receiving a reflection of the first stretched optical pulse from a target;

combining the reflected first stretched optical pulse and the second stretched optical pulse to generate a combined stretched optical pulse; and determining a wavelength of a spectral peak in the combined stretched optical pulse, the wavelength of the spectral peak being a wavelength that is present at the same point in time in both the reflected first stretched optical pulse and the second stretched optical pulse.

14. The method of claim 13, further comprising using the wavelength of the spectral peak to calculate a temporal delay between the reflected first stretched optical pulse and the second stretched optical pulse.

15. The method of claim 13, wherein generating a first stretched optical pulse and a second stretched optical pulse comprises generating the first and second stretched optical pulses using a chirped fiber Bragg grating having multiple wavelength-specific reflectors.

16. The method of claim 1, further comprising amplifying the first and second optical pulses.

17. The method of claim 1, further comprising calculating the temporal delay from the wavelength of the spectral peak.

18. The system of claim 4, further comprising an optical amplifier configured to amplify the first and second stretched optical pulses.

* * * * *

UNITED STATES PATENT AND TRADEMARK OFFICE
CERTIFICATE OF CORRECTION

| | |
|---|---|
| PATENT NO. | : 7,372,551 B1 |
| APPLICATION NO. | : 11/492744 |
| DATED | : May 13, 2008 |
| INVENTOR(S) | : Delfyett et al. |

It is certified that error appears in the above-identified patent and that said Letters Patent is hereby corrected as shown below:

Title page, Item (12) and (75) "Delfvett" should read -- Delfyett, et al. --.

Signed and Sealed this

Nineteenth Day of August, 2008

JON W. DUDAS
*Director of the United States Patent and Trademark Office*